Figure 1:
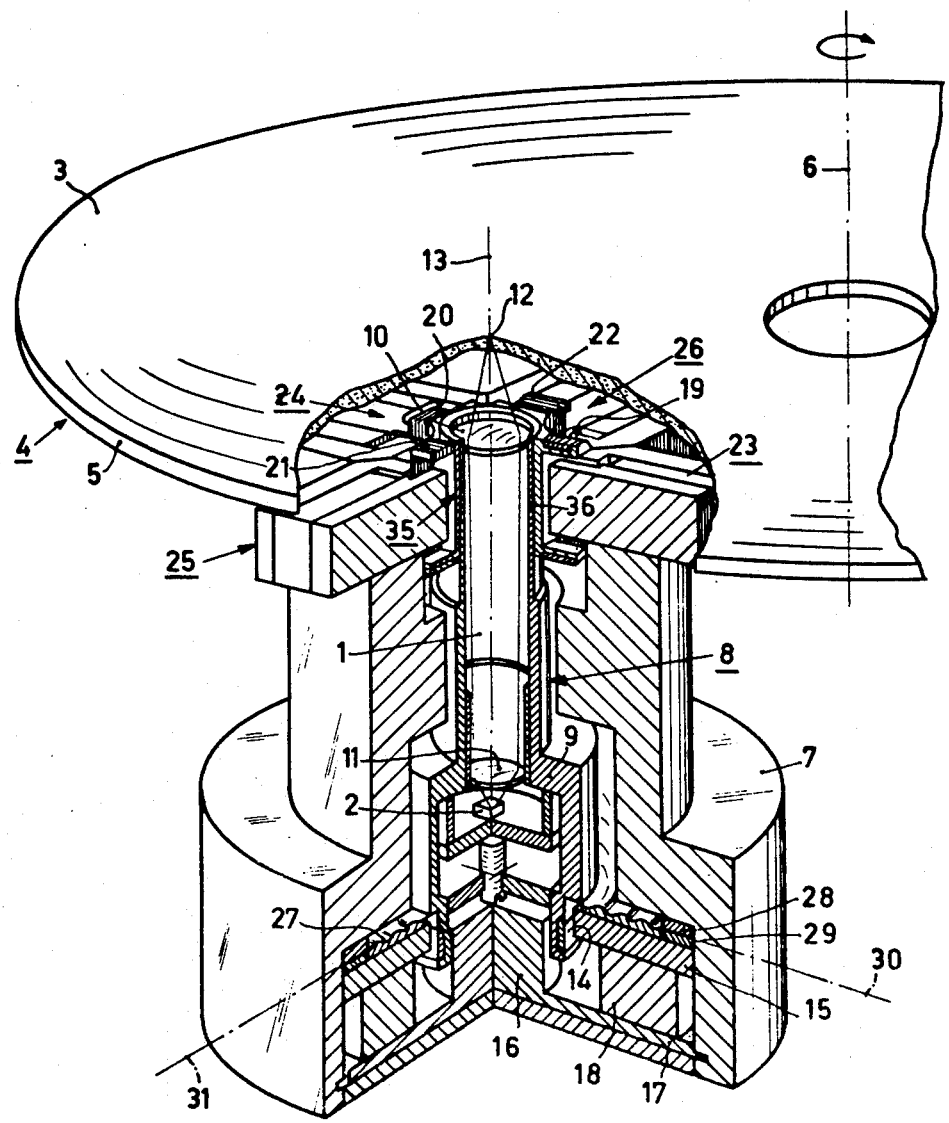

United States Patent [19]

Kleuters et al.

[11] 4,135,206
[45] Jan. 16, 1979

[54] OBJECTIVE MOUNT FOR VIDEO DISC PLAYER

[75] Inventors: Wilhelm J. Kleuters; Gerard E. van Rosmalen; Martinus P. M. Bierhoff; Kornelis A. Immink, all of Eindhoven, Netherlands

[73] Assignee: U.S. Philips Corporation, New York, N.Y.

[21] Appl. No.: 821,709

[22] Filed: Aug. 4, 1977

[30] Foreign Application Priority Data

Mar. 25, 1977 [NL] Netherlands ............... 7703232

[51] Int. Cl.$^2$ .................... H04N 5/76; G11B 7/12
[52] U.S. Cl. ........................... 358/128; 179/100.3 V; 250/201; 250/202; 310/27
[58] Field of Search ............... 179/100.3 V; 358/28; 250/201, 202; 310/25, 27, 36; 179/115.5 VC

[56] References Cited

U.S. PATENT DOCUMENTS

| | | | |
|---|---|---|---|
| 2,812,825 | 11/1957 | Matthews | 179/115.5 VC |
| 3,924,063 | 12/1975 | Simons | 179/100.3 V |
| 4,011,003 | 3/1977 | Dragt | 179/100.3 V |
| 4,032,776 | 6/1977 | Van Rosmalen | 179/100.3 V |

Primary Examiner—Bernard Konick
Assistant Examiner—Alan Faber
Attorney, Agent, or Firm—Frank R. Trifari; Simon L. Cohen

[57] ABSTRACT

An optical scanning device which scans a rotary video disc with the aid of a light beam comprises an objective which performs focussing movements, for focussing a light spot on a recording surface of the video disc, as well as tilting tracking movements and time-error correction movements. Near its lower end the objective is suspended in an impregnated corrugated loudspeaker diaphragm of fabric fibre which enables the various movements of the objective to be made without giving rise to annoying resonant effects. The tracking movements and the time-error correction movements are obtained with the aid of coils which are connected to the objective near the upper end and which are disposed in air gaps of associated permanent magnetic stators.

7 Claims, 4 Drawing Figures

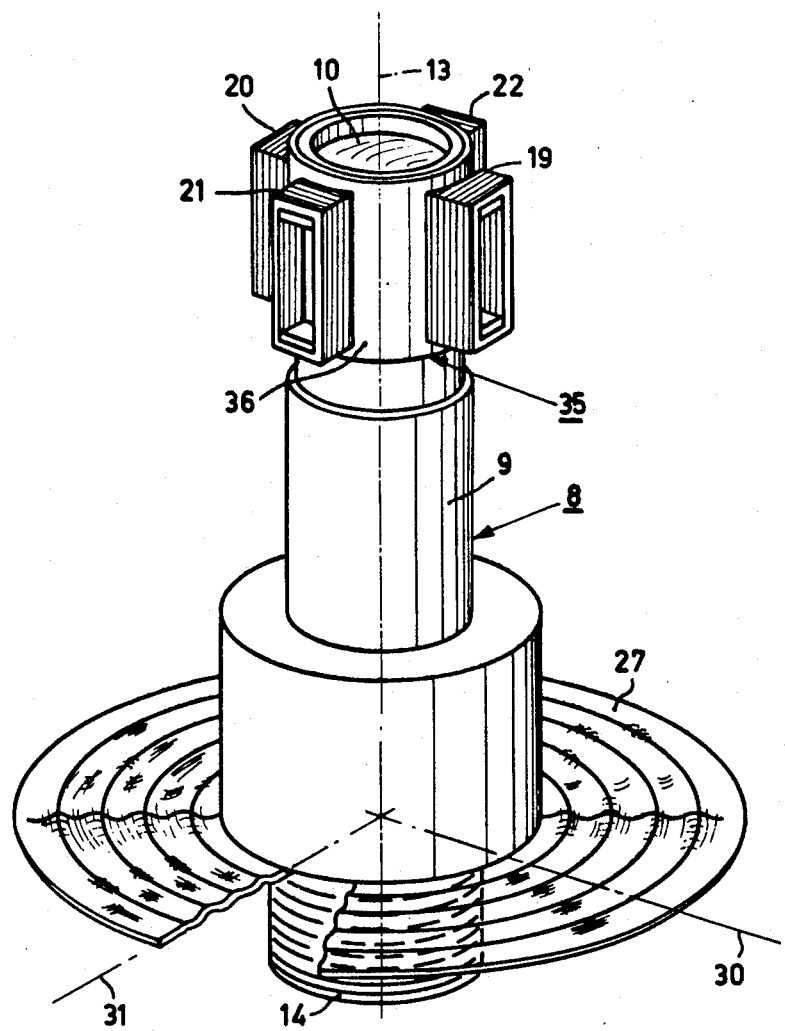
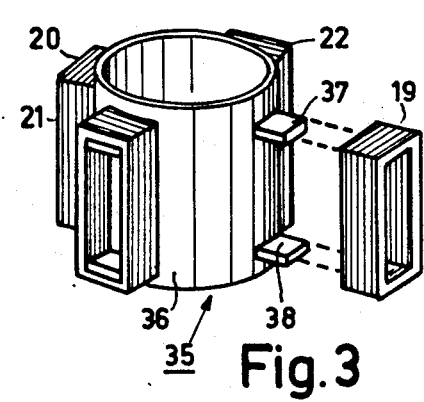 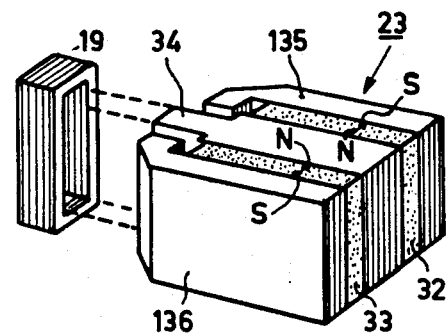
Fig. 2
Fig. 3    Fig. 4

OBJECTIVE MOUNT FOR VIDEO DISC PLAYER

The invention relates to an optical scanning device which with the aid of a radiation beam produced by a radiation source is suitable for scanning recording tracks in a recording surface of a record carrier and more specifically for scanning video and audio recording tracks in a reflecting recording surface of a rotary video or audio disc with the aid of a light beam, which device comprises: a frame; an objective with one end which during scanning of a record carrier faces the recording surface (upper end) and one end which is remote from the recording surface (lower end), and comprising a tube which accommodates a lens system with an optical axis, which objective is adapted to concentrate the radiation beam to a scanning spot in a focussing plane; a forcussing bearing arrangement for enabling focussing movements of the objective relative to the frame in a direction which at least substantially coincides with the optical axis, so as to enable occasional deviations from a general position of the recording surface of the record carrier in a direction perpendicular to the recording surface to be followed with the focussing plane; electrically controllable focussing means for electrically realizing and controlling the focussing movements of the objective; a tracking bearing arrangement for enabling tilting tracking movements of the objective relative to the frame about a tilting axis which is substantially perpendicular to the optical axis of the lens system, so as to enable occasional deviations from a general position of the recording track in a direction normal to the recording track and situated in the recording surface to be followed with the scanning spot; and electrically controllable tracking means for electrically realizing and controlling the tracking movements of the objective.

Such an optical scanning device has previously been described in U.S. patent application Ser. No. 787,610, filed Apr. 14, 1977. The focussing bearing arrangement comprises a pivotal bearing with bearing pins journalled in bearing sleeves. These pins are fitted near the center of the objective. It has been found that such optical scanning devices can be used with success in optical audio record players, but are not readily suitable for use in video disc players in view of the more stringent requirements imposed on the dynamic behavior of the scanning devices in such equipment. A description of a video disc player can be found in some related articles concerning the Philips' VLP video disc system in the magazine "Philips Technical Review", Vol. 33, 1973, No. 7, pages 178-193 (herewith included by reference). In a video disc player the video disc for example rotates with a speed of 1,500 or 1,800 revolutions per minute, depending on whether the line frequency is 50 or 60 Hz. The attainable flatness of the video disc is not better than 100 microns. The optical scanning device is located on a radially movable carriage underneath the rotating video disc and scans a spiral recording track. The depth of focus of the objective, which must focus a laser beam on a reflecting recording surface, is only ½ micron. A control system serves to ensure that the maximum error in the distance between the focussing plane of the objective and the recording surface of the video disc does not exceed this depth of focus. This means that the control system which controls the focussing movements of the objective, must be capable of a reduction by 200. In this respect reduction is to be understood to mean the quotient of the maximum error if no control system were used, in the present instance the previously mentioned 100 microns, and the maximum permissible focussing error which is acceptable when the control system is used, in this case ½ micron. For reasons of control technology said reduction implies that the closed loop of the focussing control system which includes the objective should have a bandwith of approx. 1 kHz. In order to avoid problems in the control loop owing to additional undesired phase shifts, it is desirable that the optical scanning device itself does not exhibit any significant resonance for oscillations below 10 kHz. This requirement cannot be met when the bearing arrangements for the objective described in the aforementioned Patent Application are used. This is mainly due to the play of the bearing components relative to each other or to parasitic resonances in the bearing arrangement or in the tube.

An other problem is that the optical scanning device should also comply with stringent dynamic requirements in respect of the tracking movements. This is attributable to the fact that the desired dynamic behavior may be adversely affected by flexure in the objective tube.

An other problem which is related to the pivotal movements of the objective for the purpose of tracking is that this results in obliquity of the optical axis of the objective relative to the recording surface, which gives rise to a change of the shape of the light spot which is imaged on the recording surface (coma). This results in an asymmetry of the radiation path in the transparent part of the video disc which is located between the objective and the recording surface. These distortions are particularly annoying in the case of video disc players, because the recording track of a video disc has a structure of very small dimensions.

It is an object of the invention to provide an optical scanning device of the type mentioned in the preamble which is suitable for use in a video disc player and which consequently has a large bandwith both for tracking movements and focussing movements and which gives rise to a minimal coma. The invention is characterized in that: the focussing bearing arrangement and the tracking bearing arrangement are together constituted by a single resilient suspension of the objective, comprising resilient means which are rigidly connected to the tube and the frame, and which allow both focussing movements and tracking movements; the resilient suspension is disposed near the lower end of the objective; and in that the electrical tracking means co-operate with the objective near its upper end.

The differences with the previously proposed optical scanning device are that the bearing arrangement of the objective solely consists of parts which are rigidly connected to the objective and the frame, so that no problems will occur as a result of play between bearing components. Obviously, it is desirable to ensure that the resilient means themselves do not give rise to resonances, for example by the application of a damping substance on the springs. As the resilient suspension is located near the lower end of the objective a specific tracking movement of the scanning spot only demands a minimum of tilting of the objective, so that coma is also minimized. By arranging for the electrical tracking means to co-operate with the objective near the upper end, the tilting movements of the objective are driven as directly as possible, which prevents problems owing to flexure of the objective tube.

As previously stated it is important to take steps to prevent resonance in the resilient means for the objective suspension. An embodiment of the invention which yields very good results in this respect is characterized in that the resilient means for the resilient suspension of the objective consist of an impregnated corrugated diaphragm which is made of fabric fiber. Such diaphragms are generally known from loudspeaker technology and are employed as a centering diaphragm for centering a loudspeaker coil in an air gap of a permanent magnetic circuit. Loudspeaker manufacturers have paid very much attention to centering diaphragms because they should meet stringent requirements in respect of dynamic behavior for a good reproduction quality of the loudspeakers; these requirements are so stringent that such diaphragms are directly suitable for use in a scanning device in accordance with the present invention. The said diaphragms are manufactured in very large quantities by loudspeaker manufacturers and they are very cheap, so that their use in an optical scanning device yields both technical and economic advantages.

A further embodiment of the invention is characterized in that the electrically controllable tracking means comprise at least one tracking coil which is wound from electrically conducting wire and connected to the objective near the upper end, which coil has turns which are disposed in planes which are substantially parallel to the optical axis of the lens system and which have an oblong shape, the longitudinal direction of the tracking coil being parallel to the optical axis of the lens system and the electrically controllable tracking means further comprises a permanent magnetic tracking stator which cooperates with said coil and which has an air gap in which the tracking coil can perform the focussing and tracking movements. The electrically controllable tracking means thus formed can have a high efficiency because it is possible without many problems to ensure that the lines of force of the permanent magnetic stator circuit extend perpendicularly to the coil turns. The oblong shape allows for the focussing movements to be performed by the objective in the direction of the optical axis of the lens system. In view of the stringent requirements in respect of the dynamic behavior of the scanning device an embodiment is of interest which is characterized in that the electrically controllable tracking means comprise two identical tracking coils which are disposed opposite each other on both sides of the objective and two identical permanent magnetic tracking stators. Thus a symmetrical arrangement and hence a symmetrical mass distribution are obtained.

A further embodiment of the invention is characterized in that the resilient suspension of the objective also serves as time-error correction bearing arrangement of enabling tilting movements of the objective relative to the frame for time error correction purposes, about a tilting axis which is substantially perpendicular to the optical axis of the lens system and also perpendicular to the said tilting axis for the tracking movements, so as to enable occasional deviation from a general position of the recording track in a direction which is tangential to the recording track to be followed with the scanning spot and electrically controllable time-error correction means are provided for electrically realizing and controlling the time-error correction movements of the objective, which means co-operate with the objective near its upper end. This embodiment yields another important advantage of the invention. Without any further special bearing provisions being necessary it is now possible to render the scanning device suitable for the correction of time errors. This is not readily possible with the bearing arrangements described in the aforementioned Patent Application. Yet another advantage of the invention is that during operation the electrically controllable tracking and time-error correction means are disposed right underneath the rapidly rotating video disc owing to their location on the upper end of the objective, so that the heat produced in the electrical means is automatically removed owing to the whirling air caused by the rotating video disc.

Preferably an embodiment of the invention is used which is characterized in that the electrically controllable time-error correction means comprise two time-error correction coils which are identical to the tracking coils and which are 90° offset relative to the tracking coils, as well as permanent magnetic time-error correction stators which are identical to the permanent magnetic tracking stators.

For a rigid mounting of the coils on the objective and to avoid undesired resonances a further embodiment is of importance which is characterized in that said four coils are jointly mounted on a single coil-mounting member which consists of a ring which fits around the objective tube, which ring is provided with radially extending coil bases for mounting the coils.

The invention will now be described in more detail with reference to the drawing, in which:

FIG. 1 in perspective and partly in cross-section shows an optical scanning device with a bearing arrangement which is suitable for performing movements with the objective, for the purpose of focussing, tracking and time-error correction, FIG. 2 is a perspective view of an assembly consisting of an objective, bearing diaphragm and electrical control means, FIG. 3 in perspective shows a coil mounting member with four coils for electrically controlling tracking movements and time-error correction movements, and FIG. 4 in perspective shows the co-operation between one of the coils of FIG. 3 and a permanent magnetic stator associated therewith.

FIG. 1 shows an optical device in accordance with the invention which is suitable for scanning recording tracks in a recording surface 3 of a rotating video disc 4 with the aid of a radiation beam 1 which is produced by a radiation source, which is shown only symbolically, in the form of a semiconductor laser. The structure of the video disc will not be discussed in more detail, but reference is made to the previously mentioned series of articles in "Philips Technical Review". The video disc is rotatable about an axis of rotation. This is symbolically indicated by means of a curved arrow. The means which serve for rotating the video disc are irrelevant for the invention and are not shown.

The optical scanning device comprises a frame 7 which is made of a non-magnetizable material such as a suitable plastic or aluminum. In the present Application "frame" is to be understood to mean the total of all the stationary parts of the scanning device. In a cavity in the frame an objective 8 is disposed, which comprises a tube 9 and a lens system, which is symbolically represented by two lenses 10 and 11. A description of an assembly of means in the tube 9 which ensures that the radiation beam is produced, is focussed on the recording surface to a read spot of the desired size and the reflected beam is converted into an electrical signal falls beyond the scope of the present description. For a description of a combination of means which are suitable for the present scanning device, reference is made to the U.S. patent application Ser. No. 735,120, filed Oct. 22, 1976 (which is assumed to be incorporated in the present Patent Application by reference). In the context of the present Application "objective is to be understood to mean the lens system and all the parts which are rigidly connected thereto and which are movable relative to the frame 7. The lens 10 is located near the end of the objective 8 which faces the video disc during scanning of such a disc, which end is referred to as the upper end of the objective. The opposite end of the objective is referred to as the lower end. By means of this lens system it is possible to concentrate the radiation beam 1 to a scanning spot 12 in an imaginary focussing plane. The optical axis of the lens system bears the reference numeral 13.

Near the lower end of the objective 8 an annular focussing coil 14 which is wound from electrically conducting wire is mounted on the tube 9. This coil belongs to electrically controllable focussing means for electrically realizing and controlling focussing movements parallel to the optical axis 13 of the objective. The focussing coil 14 is disposed in an air gap between a soft-iron plate 15 and a soft-iron core 16 belonging to a permanent magnetic stator. Between the soft-iron plate 15 and a soft-iron flange 17 which is connected to the soft-iron core 16 an axially magnetized permanent magnetic stator magnet 18 is located. By applying an electric current to the focussing coil 14 with the aid of means, not shown, which for the rest are irrelevant to the invention, an electromagnetic Lorenz force is exerted on the focussing coil and thus on the tube 9, which force is directed in accordance with the optical axis 13 of the objective.

Near the upper end of the objective four coils 19 through 22 which are wound from an electrically conducting material are disposed, which co-operate with permanent magnetic stators 23 through 26. These coils and stators belong to the electrically controllable means for electrically realizing and controlling tracking movements and time-error correction movements of the objective 8. These means will be discussed in more detail further in the description.

For the focussing movements and for the tracking movements a combination of a focussing bearing arrangement, a tracking bearing arrangements and a time-error correction bearing arrangement is provided, comprising a single resilient suspension of the objective 8 near the lower end, namely an impregnated, corrugated diaphragm 27 which is made of fabric fiber. This diaphragm is rigidly connected to the tube 9 by glueing and near its circumference it is also rigidly connected to the frame 7 with the aid of two rings 28 and 29 by glueing.

With the aid of the electrically controllable tracking means and time-error correction means the objective can be tilted about two tilting axes 30 and 31 which are perpendicular to each other and substantially perpendicular to the optical axis 13. The diaphragm 27 allows the various movements owing to its deformability. Even in the case of oscillating movements of high frequency the diaphragm 27 does not give rise to annoying resonances.

The tracking coils 21 and 22 which are connected to the objective near the upper end are wound from electrically conducting wire with turns which are disposed in planes which are substantially parallel to the optical axis 13 of the lens system and have an oblong shape. The longitudinal direction of the tracking coils is parallel to the optical axis. The tracking stators 25 and 26 co-operate with the tracking coils. The tracking coils are then disposed in an air gap of the associated permanent magnetic stator. Owing to the oblong shape of the coils there is sufficient room to allow the focussing movements to be performed.

Two time-error correction coils 19 and 20 which are identical to the tracking coils 21 and 22 are also located near the upper end of the objective 8 and are 90° shifted relative to the tracking coils. They co-operate with the permanent magnetic stators 23 and 24 in the same way as the coils 21 and 22 co-operate with the stators 25 and 26.

FIG. 4 shows a stator 23 and the coil 19 which co-operates therewith. The stator 23 comprises two permanent magnets 32 and 33. Their direction of magnetization is indicated by means of double arrows and the letters N and S, the letter N referring to the North pole and the letter S to the South pole. A soft-iron core 34 is glued between the magnets 32 and 33. Furthermore, two soft-iron polepieces 35 and 36 are located on both sides of the assembly consisting of the core 34 and the permanent magnets 32 and 33. Between the ends of the core 34 and the polepieces 35 and 36 a substantially homogeneous magnetic field exists whose lines of forces are parallel to the direction of magnetization of the permanent magnets 32 and 33 and are perpendicular to the portions of the turns of the coil 19 which are disposed in the air gap between the core 34 and the polepieces 35 and 36. The height dimension of the core 34 is smaller than the corresponding length dimension of the coil 19. This enables the coil 19 to perform movements relative to the core 34 parallel to the optical axis of the lens system, i.e., focussing movements. The dimensions of the air gaps are further selected so that tilting movements about the axes 30 and 31 are possibible without the coil 19 coming into contact with parts of the permanent magnetic stator 23.

The four coils 19 through 22 are jointly mounted on a single coil mounting member 35 which is made of a non-magnetic material such as for example aluminum or a plastic. It comprises a sleeve 36 which fits around the tube 9 of the objective 8, which sleeve for each coil comprises two radially extending coil bases for the fixation of the coils. The coil bases for the coil 19 bear the reference numerals 37 and 38. The assembly consisting of the coil mounting member 35 and the four coils 19 through 22 are joined to each other with the aid of a suitable glue or impregnating lacquer, so that no oscillations between the various components can occur. The connection between this assembly and the tube 9 of the objective is also made by glueing, so that the tube together with the coil mounting member and the coils constitutes one unit.

What is claimed is:

1. An optical scanning device for scanning a rotating reflective optically encoded record carrier, comprising radiation source means for providing a read beam of light;
   a frame;
   an objective means for concentrating the read beam to a scanning spot on a focussing plane, said objective means having an upper end facing said record carrier and a lower end remote from said record carrier and comprising a tube, and a lens system in said tube having an optical axis;

focussing electrical means for moving said tube and said lens system axially to focus said read beam in said record carrier;

radial tracking electrical means for moving the upper end of said tube about an axis of rotation disposed near the lower end thereof to move the read spot radially with respect to the record carrier; and a bearing arrangement for the tube of said objective means comprising resilient suspension means rigidly connected to the lower end of the objective tube and to the frame for resiliently biassing said objective for both said rotational and axial motions provided by said focussing electrical means and said tracking electrical means.

2. An optical scanning device as claimed in claim 1 further comprising time-error correction electrical means for moving the upper end of said tube about a further axis of rotation disposed near the lower end thereof to move the read spot tangentially with respect to the record carrier, and wherein the resilient suspension also comprises means for biassing the objective for movements of the objective relative to the frame about said further axis of rotation which is substantially perpendicular to the optical axis of the lens system and is also perpendicular to said tilting action for the radial tracking movements.

3. An optical scanning device as claimed in claim 1, wherein the resilient means for the resilient suspension of the objective consist of an impregnated corrugated diaphragm made of fabric fiber.

4. An optical scanning device as claimed in claim 1, wherein the tracking electrical means comprises at least one tracking coil which is wound from electrically conducting wire and which is connected to the objective means near the upper end, said coil having turns disposed in planes which are substantially parallel to the optical axis of the lens system and which have an oblong shape, the longitudinal direction of the tracking coil being parallel to the optical axis of the lens system, and the tracking electrical means furthermore comprise a permanent magnetic tracking stator cooperating with said coil, and having an air gap in which the tracking coil can perform focussing and tracking movements.

5. An optical scanning device as claimed in claim 4, wherein the tracking electrical means comprise two identical tracking coils which are disposed opposite each other on both sides of the objective and two identical permanent magnetic tracking stators.

6. An optical scanning device as claimed in claim 5, further comprising time-error correction electrical means for moving the upper end of said tube about a further axis of rotation disposed near the lower end thereof to move the read spot tangentially with respect to the record carrier and comprising two time-error correction coils which are identical to the tracking coils and which are 90° offset relative to the tracking coils, as well as permanent magnetic time-error correction stators which are identical to the permanent magnetic tracking stators.

7. An optical scanning device as claimed in claim 6, wherein said four coils are jointly mounted on a single coil-mounting member which consists of a ring which fits around the tube of the objective, which ring is provided with radially extending coil bases for the fixation of the coils.

* * * * *